United States Patent
Aoyama et al.

(10) Patent No.: US 6,865,386 B2
(45) Date of Patent: Mar. 8, 2005

(54) COMMUNICATION TERMINAL WITH DISPLAY OF CALL INFORMATION OF CALLING PARTY

(75) Inventors: Susumu Aoyama, Yokohama (JP); Yoko Fujii, Kawasaki (JP); Kyoko Jifuku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 09/785,580

(22) Filed: Feb. 16, 2001

(65) Prior Publication Data

US 2001/0046853 A1 Nov. 29, 2001

(30) Foreign Application Priority Data

May 26, 2000 (JP) ........................................ 2000-156149

(51) Int. Cl.⁷ ............................................... H04M 3/42
(52) U.S. Cl. ...................... 455/415; 455/466; 455/566; 349/142.06 A; 349/142.17; 349/93.23
(58) Field of Search ................................ 455/415, 566, 455/567; 379/142.06, 142.01, 142.04, 142.05, 142.17, 93.23, 93.24

(56) References Cited

U.S. PATENT DOCUMENTS

| | | | | |
|---|---|---|---|---|
| 5,349,638 A | * | 9/1994 | Pitroda et al. | 379/142.16 |
| 5,889,852 A | * | 3/1999 | Rosecrans et al. | 379/355.05 |
| 5,903,632 A | * | 5/1999 | Brandon | 379/93.23 |
| 6,118,859 A | * | 9/2000 | Giethoorn | 379/142.06 |
| 6,226,367 B1 | * | 5/2001 | Smith et al. | 379/142.04 |
| 6,226,512 B1 | * | 5/2001 | Macaulay et al. | 455/414.1 |
| 6,243,448 B1 | * | 6/2001 | Corbett et al. | 379/93.35 |
| 6,301,338 B1 | * | 10/2001 | Makela et al. | 379/88.21 |
| 6,389,124 B1 | * | 5/2002 | Schnarel et al. | 379/142.01 |
| 6,408,191 B1 | * | 6/2002 | Blanchard et al. | 455/566 |
| 6,418,307 B1 | * | 7/2002 | Amin | 455/413 |
| 6,424,829 B1 | * | 7/2002 | Kraft | 455/412.1 |
| 6,516,200 B1 | * | 2/2003 | Schmidt et al. | 455/518 |
| 6,526,133 B1 | * | 2/2003 | Izaki et al. | 379/142.17 |
| 6,539,240 B1 | * | 3/2003 | Watanabe | 455/566 |

FOREIGN PATENT DOCUMENTS

| | | |
|---|---|---|
| JP | 02096449 | 4/1990 |
| JP | 2000059857 | 2/2000 |

* cited by examiner

*Primary Examiner*—Edward F. Urban
*Assistant Examiner*—Blane J. Jackson
(74) *Attorney, Agent, or Firm*—Katten Muchin Zavia Rosenman

(57) ABSTRACT

The communication terminal of the present invention is characterized in comprising a control means which receives, at the time of receiving a voice call or character information, the identifying information of the transmitting party, obtains the incoming record information to this identifying information from a memory and causes the display unit to display the record information in regard to communication with the transmitting party or frequency information with a character message or image.

22 Claims, 11 Drawing Sheets

RECORD AND FREQUENCY CONDITION

| RECORD | FREQUENCY CONDITIONS |
|---|---|
| TODAY | TWICE, TODAY |
| YESTERDAY | EVERYDAY |
| THE DAY BEFORE YESTERDAY | FREQUENT |
| THREE DAYS OR MORE BEFORE | TODAY, ONLY |
| NONE | TODAY, ONLY |

PERSONAL DATA

| PERSONAL DATA | | | INDIVIDUAL DATA SEX = MALE | INDIVIDUAL DATA SEX = FEMALE |
|---|---|---|---|---|
| FRIEND | MALE | LIKE | 3. LIKE, FRIEND, OPPOSITE SEX | 4. LIKE, FRIEND, OPPOSITE SEX |
| | | DISLIKE | 10. DISLIKE, FRIEND, SAME SEX | 11. DISLIKE, FRIEND, SAME SEX |
| | FEMALE | LIKE | 5. LIKE, FRIEND, OPPOSITE SEX | 3. LIKE, FRIEND, OPPOSITE SEX |
| | | DISLIKE | 11. DISLIKE, FRIEND, SAME SEX | 10. DISLIKE, FRIEND, SAME SEX |
| ACQUAINTANCE | MALE | LIKE | 6. LIKE, FRIEND, OPPOSITE SEX | 7. LIKE, FRIEND, OPPOSITE SEX |
| | | DISLIKE | 13. DISLIKE, FRIEND, SAME SEX | 14. DISLIKE, FRIEND, SAME SEX |
| | FEMALE | LIKE | 8. LIKE, FRIEND, OPPOSITE SEX | 6. LIKE, FRIEND, OPPOSITE SEX |
| | | DISLIKE | 14. DISLIKE, FRIEND, SAME SEX | 13. DISLIKE, FRIEND, SAME SEX |
| SWEETHEART | MALE | LIKE | | 1. LIKE, SWEETHEART, OPPOSITE SEX |
| | | DISLIKE | | |
| | FEMALE | LIKE | 2. LIKE, SWEETHEART, OPPOSITE SEX | |
| | | DISLIKE | | |
| FAMILY | MALE | LIKE | 9. LIKE, FAMILY | 9. LIKE, FAMILY |
| | | DISLIKE | 15. DISLIKE, FAMILY | 15. DISLIKE, FAMILY |
| | FEMALE | LIKE | 9. LIKE, FAMILY | 9. LIKE, FAMILY |
| | | DISLIKE | 15. DISLIKE, FAMILY | 15. DISLIKE, FAMILY |
| BUSINESS | MALE | LIKE | 10. LIKE, BUSINESS | 10. LIKE, BUSINESS |
| | | DISLIKE | 16. DISLIKE, BUSINESS | 16. DISLIKE, BUSINESS |
| | FEMALE | LIKE | 10. LIKE, BUSINESS | 10. LIKE, BUSINESS |
| | | DISLIKE | 16. DISLIKE, BUSINESS | 16. DISLIKE, BUSINESS |

FIG. 9

COMMUNICATION TERMINAL WITH DISPLAY OF CALL INFORMATION OF CALLING PARTY

BACKGROUND OF THE INVENTION

1. Field of the Invention

The present invention relates to a communication terminal comprising a transmitting/receiving function for connection (by wire or radio) with a network and a display such as a liquid crystal display panel to display at least one of messages and images.

Moreover, the present invention relates to a communication terminal which has an improved operational ability for users in displaying conditions of communication during transmission/reception or comments with a message or image, or a combination of message and image during an operation for registration of memory dial (storing a number in memory) or the like.

2. Description of the Related Art

A certain kind of telephone set including a hand-held telephone set is provided with a memory to store the telephone number and the name. A user is therefore capable of selecting the name through the key input operation and the telephone set automatically originates a call using the telephone number corresponding to the name (memory dial function).

Moreover, a certain kind of telephone set including a hand-held telephone set is provided with a function to store on a time-series basis the telephone numbers of the called parties in a call outgoing sequence (outgoing record storing function) and a function to store on a time-series basis the telephone numbers of the calling parties in a call incoming sequence (incoming record storing function).

A system which is now put into practical use is capable of displaying the calling party number on the display of an incoming side terminal by providing the calling party number (telephone number of the calling party device) to the incoming side terminal such as a telephone set or the like connected to the switching network. Moreover, the technique which is already put into practical use enables, by previously registering the name of the calling party corresponding to the calling party number in the memory of the terminal such as telephone set (in some cases, the memory dial explained above is used), display of the name of the calling party corresponding to the calling party number provided from the switching network side, on the display by reading such name from the memory when a call is received at this terminal. In a certain technique of the related art, the calling party number is displayed in place of the name of the calling party (calling party number display function).

Moreover, a certain kind of hand-held telephone set realizes transmission and reception not only of audio data but also message data and image data.

As a service for transmitting and receiving message data, for example, an E-mail/character information transmitting service, etc. may be listed. A user is capable of inputting the message using the ten-key pad of a hand-held telephone set or a keyboard connected to the hand-held telephone set. The input message is transmitted, for example, through a packet communication technique using the transmitting function of such a hand-held telephone set. On the other hand, the hand-held telephone set having received such a message displays the message on the liquid crystal panel display.

For transmission and reception of image data, the following techniques are known.

In a mobile terminal, the calling terminal side transmits the image data, while the incoming terminal side combines the received image data and the images selected in its own terminal side and displays such combined images on the display of its own device and returns the selected images to the calling terminal side. This technique is intended to realize communication between the calling party and called party by transmitting and receiving the image data among the mobile terminals and then combining, in the respective terminals, the transmitted image data and received image data to display on the display thereof.

Moreover, a hand-held terminal such as the hand-held telephone set of the related art is also provided with a function to provide access to the Internet. Using the hand-held terminal, a user is capable of accessing to various Web sites of the Internet to browse various contents and transmit or receive the E-mail via the Internet.

The hand-held terminal that can receive such service is also provided, in addition to the ordinary communication function, with the message data transmitting/receiving function and the image data transmitting/receiving function. However, it is essential for the hand-held terminal to realize reduction in size and weight. Therefore, it is impossible to realize a wide area liquid crystal panel display. Therefore, the number of characters displayed on the display and the image size are naturally restricted.

Therefore, in the Web site, it is required to provide contents corresponding to the small size display area of the hand-held terminal or provide the contents for an ordinary personal computer through conversion to the contents for the hand-held terminal.

However, in the related art technique explained above, the telephone set only displays, upon reception of the message, the received message on the display. Namely, related information of the message transmitting party and receiving party (only the name and telephone number of the transmitting party are not included in this related information) is not particularly reflected on the display content of the display.

Moreover, the technique to combine and display the image data respectively in the mobile terminals under the communicating condition has a problem that the amount of communication increases due to transmission and reception of image data. Moreover, as explained above, this mobile terminal does not display the images and messages reflecting the related information between the transmitting party and receiving party.

Moreover, a telephone set has the outgoing record (history) storing function and incoming record (history) storing function, but these records (histories) are only stored on the time-series basis in the outgoing sequence and the incoming sequence. The telephone set of the related art technique does not store such records (histories) for each calling party and called party (associating the history to the calling or called party). In addition, the telephone set does not select and display, on the display, the comments and images or the like for each calling party and called party using the stored histories.

Moreover, in a certain service of the related art, the images provided by a service provider can be obtained through a download operation via the Internet and are then displayed on the display. In this case, however, these images do not operate corresponding to an inter-relationship with the party for transmission and reception of mails and communication. Namely, inter-related information between the transmitting party and receiving party is not reflected in the image displays. In addition, when the communication terminal receives the message or the like on the particular date and time, it does not display the particular image and message on the display of this communication terminal. Accordingly, it is impossible to easily determine whether the message or the like is received as scheduled or not.

It is an object of the present invention to provide a communication terminal that can be used and operated easily by a beginner by displaying comments and images or the like depending on the conditions of communication on the basis of the related information between the transmitting party and receiving party.

Moreover, it is an object of the present invention to provide a communication terminal for easily detecting the conditions of communication for every communication party by selectively displaying comments and images, etc. on the display depending on the communication record (history) of each calling party and called party.

In addition, it is an object of the present invention to provide a communication terminal that easily detects conditions of communication and assures excellent operational ability even for a beginner.

SUMMARY OF THE INVENTION

The communication terminal of the present invention is characterized in comprising a control unit for receiving identifying information of the transmitter and obtaining the communication record (history) information corresponding to this identifying information from a storage area and displaying, on the display, the record (history) information or frequency information of the communication with the transmitter in the form of a message or image.

Moreover, the communication terminal of the present invention is characterized in comprising a first memory for storing personal data, as the related information between its own communication terminal user and the other communication terminal users, corresponding to the identifying information of the other communication terminal or the other communication terminal users and the control unit for obtaining the personal data from the first storing part using the identifying information of the communication terminal of the transmitting party or user of such other communication terminal at the time of incoming or after display of the receiving content and selectively displaying a character message or image on the display through a combination of the personal data and the received record information.

BRIEF DESCRIPTION OF THE DRAWINGS

FIG. 9 illustrates a diagram for explaining the setting of personal data and history conditions.

DESCRIPTION OF THE PREFERRED EMBODIMENTS

A preferred embodiment of the present invention will be explained with reference to FIG. 1.

Figure 1:
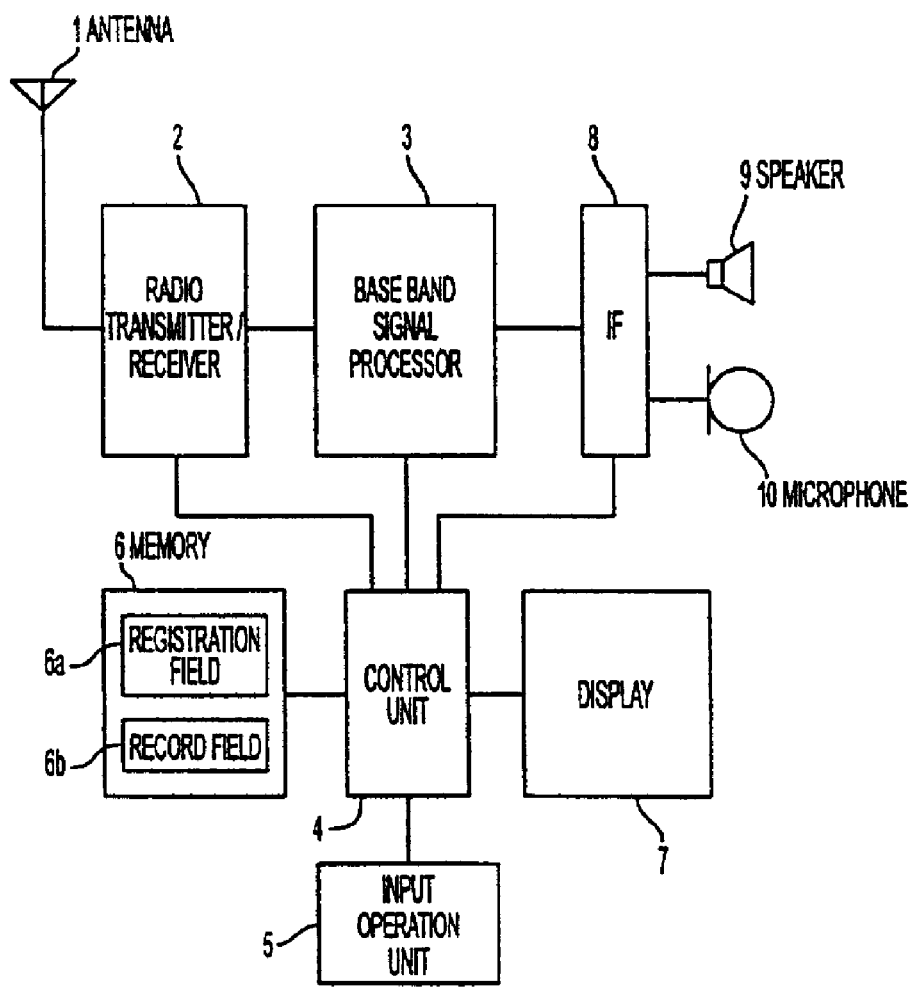
FIG. 1 illustrates a diagram for explaining a preferred embodiment of the present invention.

In FIG. 1, 1 designates an antenna; 2, a radio transmitter/receiver; 3, a base-band signal processor; 4, a control unit; 5, an input operation unit; 6, a memory corresponding to a storing means, first, second and third memory; 6a, a registration field; 6b, a record field; 7, a display; 8, an interface (IF); 9, speaker; 10, a microphone. Here, FIG. 1 illustrates a structure of a hand-held telephone set when it is connected to the network by radio transmission and when a communication terminal such as a telephone set or the like is connected to the network by wire, the radio transmitter/receiver 2 is replaced with a transmitting/receiving function unit connected with a wired link.

As a basic structure of the communication function, data transmitting/receiving function and display function, the structure similar to that of an ordinary hand-held telephone set may be used and the radio transmitter/receiver 2 includes a radio frequency modem corresponding to the TDMA (Time Division Multiple Access), FDMA (Frequency Division Multiple Access) and CDMA (Code Division Multiple Access) systems or the like and has a function to realize radio transmission and reception with a base station (not illustrated) or with a communication terminal such as another hand-held telephone set via the antenna 1. Moreover, the base-band signal processor 3 performs, via the interface 8, the processing of the audio signal for speaker 9 or microphone 10, data depending on the transmission/reception format and message data or image data and transfers such message data and image data to the control unit 4. Therefore, the transmitting/receiving function has been realized with the structure including the radio transmitter/receiver 2 and base-band signal processor.

Moreover, the control unit 4 has a structure including a microprocessor in order to control each part. The control unit 4 controls transmission of a dial number for the network (outgoing control), registration of various information pieces for registration field 6a or selection or display of display content of display 7, for example, depending on the input information from the input operation unit 5 by the key operation of the function key such as a ten-key pad, (selection) determination key and cursor key, etc. and key operation of the keyboard.

Moreover, the memory 6 has the domain for storing various programs for transmission and reception control and the transmitting and receiving of mails, the storing domain indicated as the registration field 6a and record field 6b and domain for storing message data and image data of the other comments or the like. In the storing domain indicated as the registration field 6a, the own personal information (for example, a user of the terminal) and that of a communication partner and the personal data as the related information between a user of its own communication terminal and a user of the other communication terminal are registered. Moreover, in the storing domain indicated as the record field (6b), the communication record (history) information corresponding to the partner for transmission and reception of message information, image information and E-mail and for telephone communication is recorded. For example, keeping a history of communication with another party.

The registration field 6a corresponds to the first memory for storing the personal data as the related information between a user of its own communication terminal and a user of the other communication terminal in correspondence with the other communication terminal identifying information. The record (history) field 6b corresponds to the second memory for storing the incoming record (history) information in correspondence to the identifying information of the transmitter (the communication terminal of the transmitting party or the user of the communication terminal). It is also possible to form the record (history) field 6b in the structure corresponding to the third memory for storing the outgoing history (record) information in correspondence to the identifying information of the communication terminal of the transmitter (the communication terminal of the transmitting party or the user of the terminal). Moreover, it is also possible to form the registration field 6a in the structure corresponding to the fourth memory to register the receiving scheme. Various programs may also be stored in the ROM (Read Only Memory) and EPROM or the like. In addition, it is also possible to form the structure of memory in which the registration field 6a is isolated from the record field 6b.

The display 7 may be formed of a liquid crystal panel and an electro luminescence (EL) panel or the like. This display 7 displays date, field intensity, comments with characters and images and content of transmitting and receiving mails. The control unit 4 performs processes, with the programs stored in the memory 6, for registration of the personal data such as the name of users and registration of personal data as the related information between a user and a communication partner. Moreover, control unit 4 controls the display 7 to display various information comments corresponding to the conditions of communication using the information registered in the registration field 6a and communication record (history) information registered in the record field 6b.

For example, control unit 4 controls the display 7 to display the comment for registration of personal data such as user name, etc. at the time of initial setting. Here, when the personal data is input by a user from the input operation unit 5, the control unit 4 registers this personal data to the registration field 6a. Moreover, the control unit 4 controls the memory 6 to store the kinds of character (image) selected with the input by a user from the input operation unit 5 at the time of initial setting (or as required) and also displays various scenes (images) as a single frame or as a plurality of frames of the character (image) of the kinds stored as the selected character (image) in the memory 6 at the time of displaying various scenes. In addition, the control unit 4 controls the display 7 to display the guide (help) comment for registering the personal data as the related information between a user and a communication partner when such communication partner is not stored in the registration field 6a. Therefore, a user performs the input operation from the input operation unit 5 to register the personal data as the related information for such a communication partner to the registration field 6a. Even when the parameters such as related information and record (history) information are identical, as the content of the comment displayed corresponding to the kinds of character is different, it is possible for the character of each kind to be assumed as to have respective individuality by storing a different set of display comments to the memory 6 for each kind of character.

Here, it is also possible to store the programs to realize these processing functions into a storage medium such as a magnetic disc, semiconductor memory and optical disc or the like and store these programs to the memory 6 by reading these programs under the control of control unit 4. In this case, it is also possible for the communication terminal not provided with a driver for the storage medium to download the data once read with a personal computer to the memory 6.

Figure 2:
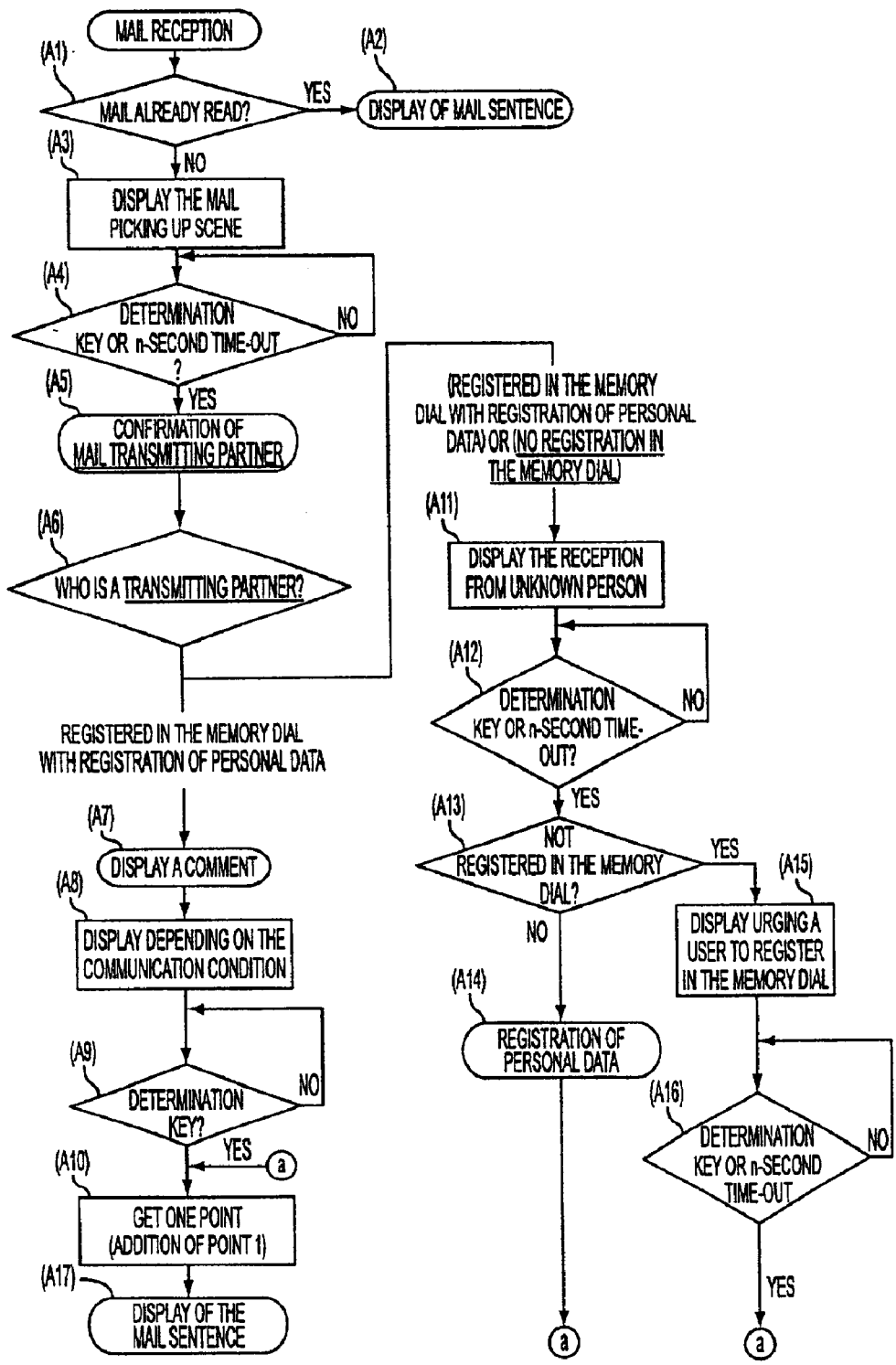
FIG. 2 illustrates a flowchart at the time of receiving a mail message in a preferred embodiment of the present invention.

FIG. 2 is a diagram illustrating the flowchart when a mail (or may be message, image information or the like) is received in a preferred embodiment of the present invention. The control unit 4 of the communication terminal (here, hand-held telephone set) determines, upon reception (incoming) of a mail message via the switching network or Internet, whether such mail is already read or not (A1). Here, the control unit 4 also stores in the memory 6 the information indicating that such mail is already read or not (read/non-read information) and executes the determination of step A1 using such information (for example, the flag 1 is stored for read information, while the flag 0 for non-read information). For the read information (for example, flag 1), the message of the mail is displayed (A2). Namely, the control unit 4 controls the display 7 to read again, from the memory 6, the content of the mail (message and image or the like) stored in the memory 6 in order to display such content.

For the non-read information (for example, flag 0 for the non-read information), the control unit 4 displays the mail pickup scene by the character image previously set by the user in the initial setting (it is also possible that the hand-held telephone set automatically selects at random the character) as the still image consisting of single frame or as a moving image consisting of a plurality of frames (A3).

In this case, when the mail is transmitted from a user registered in the memory dial (personal information is registered in the registration field 6a), it is also possible for the control unit 4 to control the display 7 to display the name and likeness image of the communication partner registered as a part of the mail pickup scene using the information of the registration field 6a. Thereby, the control unit 4 determines whether the determination key of the input operation unit 5 is depressed by a user or not or the time-out of n-second has been generated or not (A4). When depression of determination key or time-out is detected, the control unit 4 confirms the communication partner (A5). Namely, the control unit 4 determines the condition of registration of the transmitting party (A6). When this transmitting party is already registered in the memory dial and personal data of this party is registered, namely when the dial number and personal data of the transmitting party are registered in the registration field 6a of memory 6 (refer to FIG. 1), the control unit 4 controls the display 7 to display a comment (A7). In this case, the comment is different in its content depending on the personal data and communication conditions such as the number of times of communication and the communication frequency, etc. (A8). Moreover, the control unit 4 determines whether the determination key of the input operation unit 5 of a user is depressed or not (A9). When depression of the determination key is detected, one point is added to a point value stored under the management of memory 6 to update the point value (A10) and the mail content is displayed on the display 7 (A17). When the mail content is displayed, the control unit 4 updates the read non-read information in the memory 6 to update to read information (for example, flag 1).

When the transmitting party is not yet registered in the memory dial or when the transmitting party is registered in the memory dial but the personal data is not yet registered, the control unit 4 reads, from the memory 6, the still image data or moving image data, message data indicating that a mail is received from unknown person and controls the display 7 to display the scene including character image and the comment (A11). Here, the control unit 4 determines whether the determination key of the input operation unit 5 of user is depressed or not or n-second time-out is generated or not (A12). When depression of determination key or time-out is detected, whether registration to memory dial is executed or not is determined (A13). When it is determined that memory dial registration was performed, the control unit 4 controls the display 7 to display the process to register the personal data, namely the guide comment for registration of personal data (previously stored in the memory 6)(A14) and goes to the process of step (A10).

When it is determined that memory dial registration is not yet performed, the control unit 4 causes the display 7 to display the guide comment for memory dial registration and the scene by the still image or moving image of character (of course, display of only comment or image and display of both comment and image are also possible)(A15). Here, the control unit 4 determines (A16) whether the determination key of the input operation unit 5 of user is depressed or not or the n-second time-out is generated or not (A16) and when depression of determination key or time-out is detected, the control unit 4 goes to the step (A10). The n-second of the time-out period corresponds, even when depression of determination key is not detected, to the waiting time until control unit 4 goes to the next step. The value n may be fixed for the handheld telephone set or may be set preferably depending on the operation of the input operation unit 5 of the user.

Figure 3:
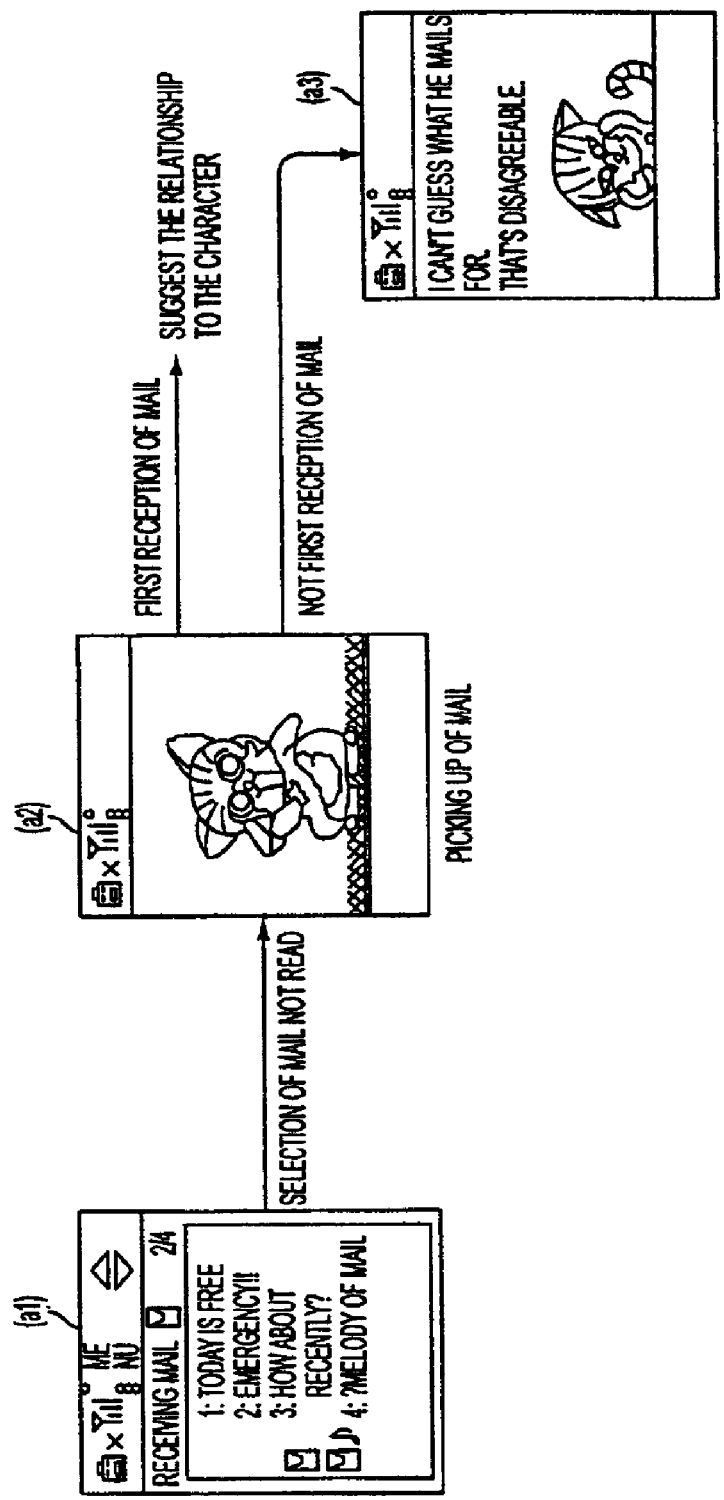
FIG. 3 illustrates a flowchart for explaining the mail pickup scene (image) in a preferred embodiment of the present invention.

FIG. 3 is a diagram for explaining the mail pickup scene in a preferred embodiment of the present invention. (al) indicates an example of display content of display 7 (refer to FIG. 1). "2/4" displayed on the image in regard to the E-mail indicates that two mails are not yet read among four mails received and stored in the memory 6. When a user selects display of such non-read mails with the input operation unit 5, the control unit 4 controls the display 7 to display (corresponding to A3 in FIG. 2) the mail pickup scene with the character image indicated in (a2) (only one frame among a plurality of frames is indicated) as the mail pickup scene.

Here, the control unit 4 determines whether the received mail has been received first or not. Namely, the control unit 4 determines whether a mail has been received previously from this mail transmitting party (not the first reception) or not (first reception) using the communication record (history) information stored in the record field 6b (refer to FIG. 1). For this determination, the control unit 4 stores, in the record field 6b, the transmitting party number and corresponding incoming date information as the communication record (history) information. The control unit 4 searches the incoming date information corresponding to the transmitting party number added to the mail received this time among the recording information of the record field 6b. When the incoming date information cannot be searched, incoming of the mail is determined as the first incoming. Here, it is also possible for the record field 6b to store only the number of times of incoming.

When reception of mail is determined as the first reception and it is also determined that memory dial registration (registration of personal data) is not performed to the registration field 6a, the control unit 4 controls the display 7 to display the image and comment sentence by reading, from the memory 6, image data of a character and data of the comment sentence indicating the sequence for registration of personal data to the user. This comment sentence can be virtually defined as the language of the character image by simultaneously displaying the character image and comment sentence (question sentence)(hereinafter, registration of data by display of character image and comment sentence is called the registration depending on the question format). Here, a user registers the personal data as the related information between user and transmitting party to the registration field 6a in such a form as inputting the content in response to such question (refer to step A14 in FIG. 2). Moreover, when it is determined that reception is not the first reception, the control unit 4 controls the display 7 to display the character image and comment indicated in (a3), for example, at the time of the second reception. A kind of character image may be selected by a user at the time of initial setting that will be explained later.

Figure 4:
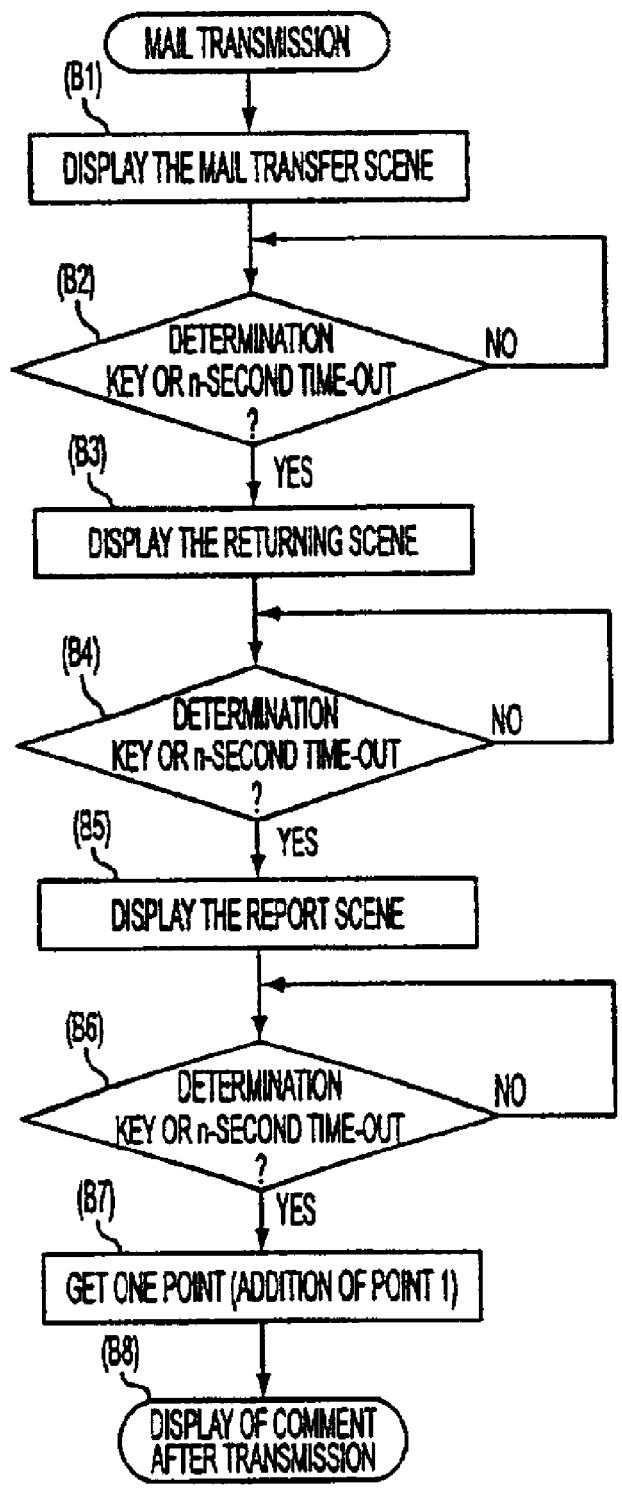
FIG. 4 illustrates a flowchart at the time of transmitting a mail message in a preferred embodiment of the present invention.

FIG. 4 illustrates a flowchart at the time of mail transmission in a preferred embodiment of the present invention. The control unit 4 determines whether the determination key of the input operation unit 5 is depressed by a user or not or the n-second time-out has been generated or not (B2). When depression of the determination key or time-out is detected, the control unit 4 controls the display 7 to display the scene that a character sends the mail and returns (this display is realized by reading the image data stored in the memory 6)(B3). Here, the control unit 4 determines whether the determination key has been depressed by a user or time-out has occurred (B4). When depression of determination key or time-out is detected, the control unit 4 controls the display 7 to display the scene to notify that a character has distributed a mail (B5). (This scene may be realized by reading the image data stored in the memory 6. The data for displaying each scene and comment in the following explanation is read from the memory 6 and is displayed on the display 7 under the control of the control unit 4.) The control unit 4 determines whether the determination key is depressed by a user or not or whether n-second time-out is generated or not (B6). When depression of determination key or time-out is detected, the control unit 4 adds point 1 to the point values stored in the memory 6 to update the point value (B7) and controls the display 7 to display the comment after mail transmission (B8).

Figure 5:
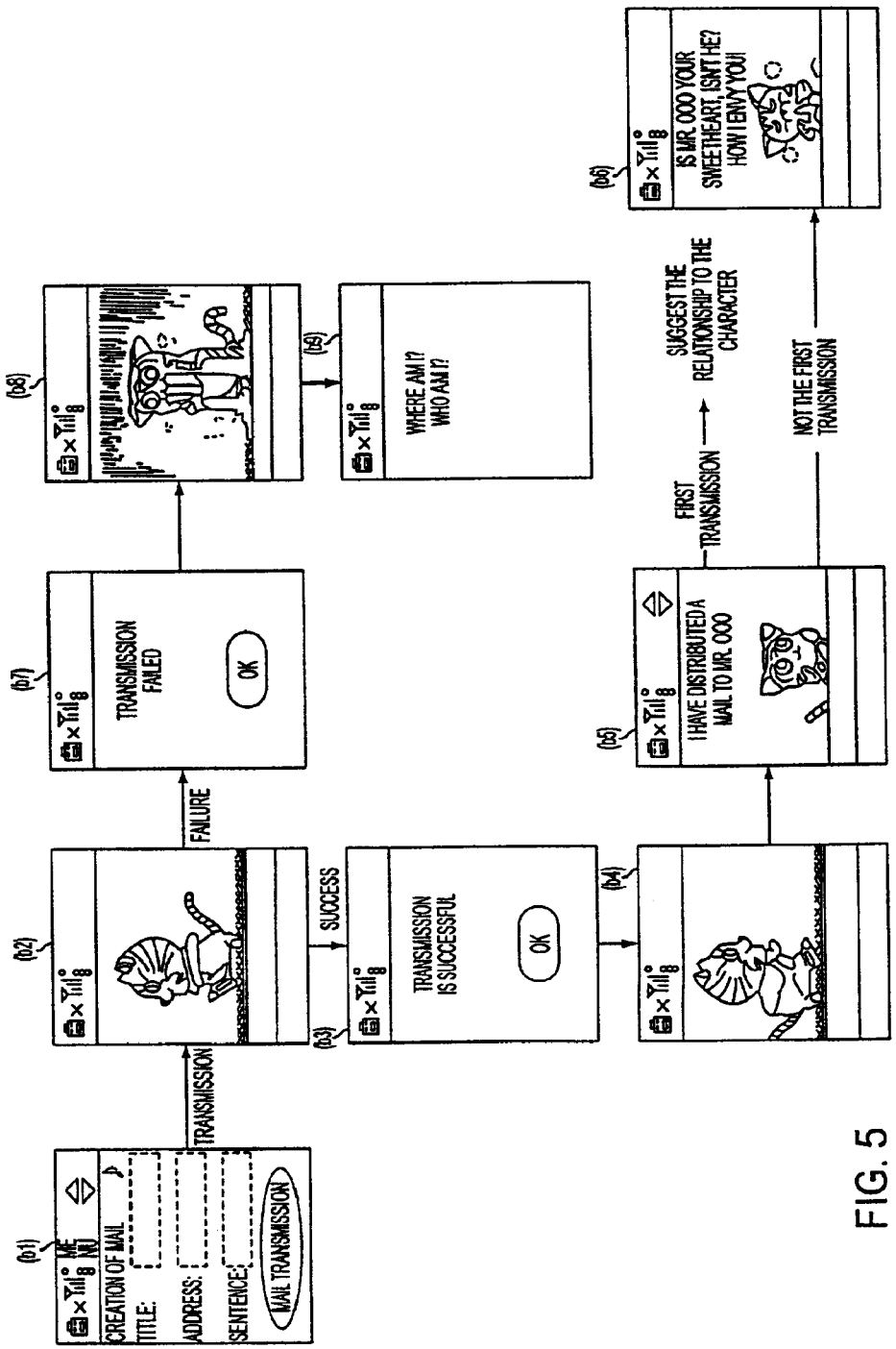
FIG. 5 illustrates a diagram for explaining a display at the time of transmitting a mail message in a preferred embodiment of the present invention.

FIG. 5 is a diagram for explaining the display at the time of transmitting a mail in a preferred embodiment of the present invention. (b1) indicates an example of content displayed on the display 7 under the control of the control unit 4 when a transmitting mail is generated. When a user designates an icon to indicate mail transmission among the display contents of (b1), the control unit 4 controls the display unit 7 to display the scene that the character carries a mail as indicated by (b2) depending on the step (B1) of FIG. 4. The control unit 4 further controls the display unit 7, when the mail transmission is completed successfully, to display the comment "A mail is transmitted" or "transmission is successful" as indicated in (b3). Thereafter, the control unit 4 controls the display unit 7 to display the scene that a character is returning after transmission of mail as indicated in (b4) depending on the step (B3) of FIG. 4. Moreover, the control unit 4 also causes the display 7 to display, depending on the step (B5) of FIG. 4, a report message of processing result, for example, "A mail has been transmitted to Mr. Tanaka" together with the image of the character.

After display of (b5), the control unit 4 refers to the communication record (history) information (recording content of memory 6b) recorded in the record field 6b (refer to FIG. 1) to determine whether this transmission is the first transmission to the relevant terminating party from this hand-held telephone set or not. When the control unit 4 determines this transmission is the first transmission, the personal data of the receiving party is registered in the registration field 6a with the registration job depending on the question format from the character.

When the control unit 4 determines such transmission is not the first transmission, the character image and comment sentence are displayed on the display 7 depending on the current communication condition based on the personal data registered in the registration field 6a and communication record (history) information recorded in the record field 6b. For example, when the transmission is completed which is one of the conditions of communication, the control unit 4 controls the display 7 to display the comment for execution of mail transmission indicated in (b6). Here, the personal data is "sweetheart" and communication record information is "second transmission".

However, if the network is congested, or if a fault is occurring in the communication terminal such as the hand-held telephone set of the terminating party, the hand-held telephone set cannot transmit a mail. In this case, the control unit 4 causes the display 7 to display the comment, "Transmission has failed" depending on the condition of communication (failure of transmission process) as indicated in (b7). Moreover, the control unit 4 controls the display 7 to display the scene as the image (or moving image) that a character is in the regrettable condition (b8). Moreover, the control unit 4 causes the display 7 to display the comment indicated in (b9). (b2) and (b4) indicate one frame among a plurality of frames of such a moving image. As explained above, since the character image and comment are displayed on the display 7 depending on the condition of communication at the hand-held telephone set (such as normal completion or irregular completion of transmission), a user can easily detect current communication condition.

Figure 6A:
FIG. 6 illustrates a diagram for explaining a scene (image) with characters.
Figure 6B:
Figure 6C:
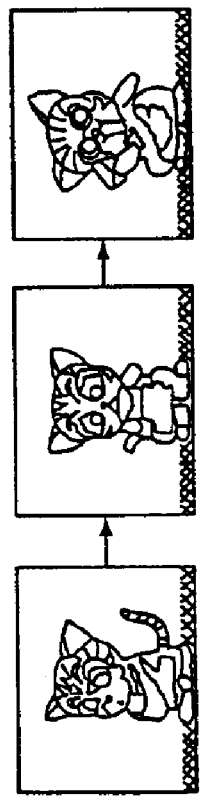

FIGS. 6A, 6B, and 6C is a diagram for explaining scenes of a character. Namely, images of a plurality of frames used for displaying the character as the moving image are illustrated. (6A) illustrates the diagrams for explaining the images used to display the mail carrying scene formed of five frames. Here, it is also possible to add one or a plurality of non-display frames (white frame) in the last part. Moreover, (6B) illustrates the diagram for explaining the images used to display the scene that the character returns after carrying the mail formed of five frames. The image of (b2) of FIG. 5 corresponds to one frame in the scene of FIG. 6A. An image of (b4) in FIG. 5 corresponds to one frame in the scene of FIG. 6B. FIG. 6C illustrates the diagram for explaining the images used to display the mail pickup scene formed of three frames. The image of (a2) of FIG. 3 corresponds to one frame in the scene of FIG. 6C.

In order to enhance the pleasure of the character display explained above, it is enough, for example, to previously store image information of a plurality of frames to each character of a plurality of kinds to the memory 6 (refer to FIG. 1). Namely, a user selects and sets only one character of those of a plurality of kinds using the input operation unit 5. At the time of such selection and setting, the control unit 4 causes the display 7 to display the guidance comment for setting. Moreover, the control unit 4 also controls the display 7 to sequentially display a plurality of kinds of character images in view of assuring easier selection for a plurality of kinds of character images by a user. A user can select only one kind of character with the input operation unit 5. Thereby, the control unit 4 instructs the display 7 to read the character image of a selected kind from the memory 6 and display this character image at the time of subsequent display of the comment (simultaneously with display of comment or before and after such display). When the point value stored in the memory 6 has exceeded the predetermined value due to the addition of the point indicated in the step (A10) of FIG. 2 or in the step (B7) of FIG. 4, the control unit 4 causes, for example, the display unit 7 to display the ending event image. Thereafter, the control unit 4 controls the display 7 to display the comment urging a user to select again the kind of character (selection of the same kind of character is also allowed) in view of setting the selected character as the new character (not illustrated).

Figure 7:
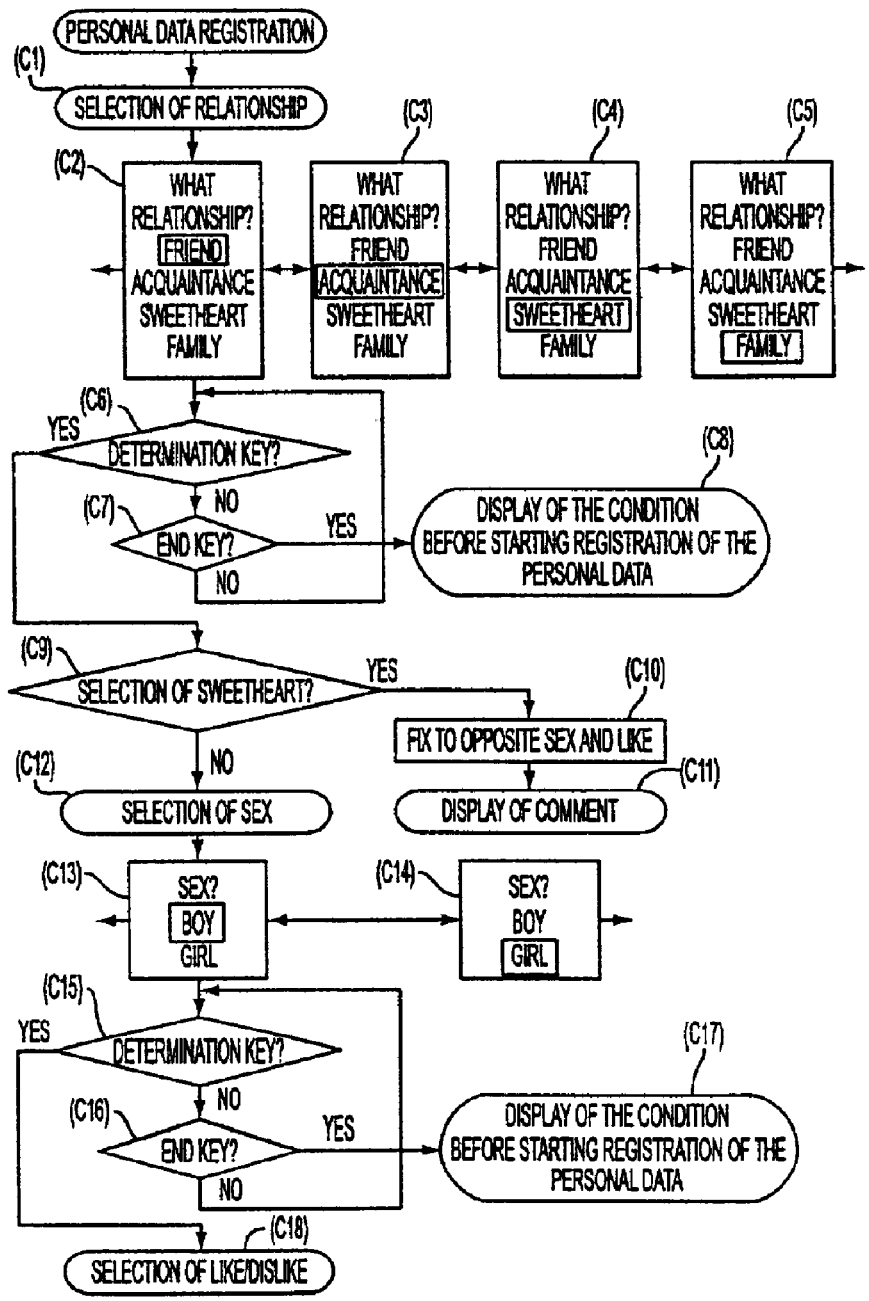
FIG. 7 illustrates a flowchart for registering personal data in a preferred embodiment of the present invention.

FIG. 7 illustrates a flowchart for personal data registration in a preferred embodiment of the present invention. First, a user selects the relationship with a communication partner (C1) using the input operation unit 5. For example, a user selects any relationship among, for example, friend/acquaintance/sweetheart/family as indicated in (C2) to (C5) as the related information (personal data) between a user and communication partner. As will be explained later, the related information such as business relationship can also be set as a selection item. Here, the control unit 4 determines whether the determination key of the input operation unit 5 is depressed by a user or not (C6). The control unit 4 determines whether the end key of the input operation unit 5 is depressed by a user or not (C7). When depression of the end key is detected, the condition returns to that before starting the personal data registration (C8). When depression of the determination key is detected in place of depression of the end key, the control unit 4 determines whether a sweetheart is selected or not as the relationship (C9). When a sweetheart is selected by a user, the control unit 4 automatically sets and registers, to the memory 6a, the items, opposite sex (when the sex is different from the user of own device) and favorite person as the personal data of the communication partner and controls the display 7 to display the character image and comment of the kind selected previously (C11) as explained above.

Moreover, when the sweetheart is not selected by a user, the control unit 4 urges the user to select the sex (C12). Namely, the control unit 4 controls the display unit 7 to display the content urging the user to select any sex of male or female as illustrated in (13). Here, the control unit 4 determines whether the determination key of the input operation unit 5 is depressed by a user or not (C15). Here, when depression of the determination key is not detected, the control unit 4 determines whether the end key is depressed by a user or not (C16). Upon detection of depression of the end key, the control unit 4 displays the condition before starting registration of the personal data (C17). Moreover, in the step (C15), the control unit 4 shifts, upon detection of depression of the selection determination key, to the process to select like or dislike (C18).

Figure 8:
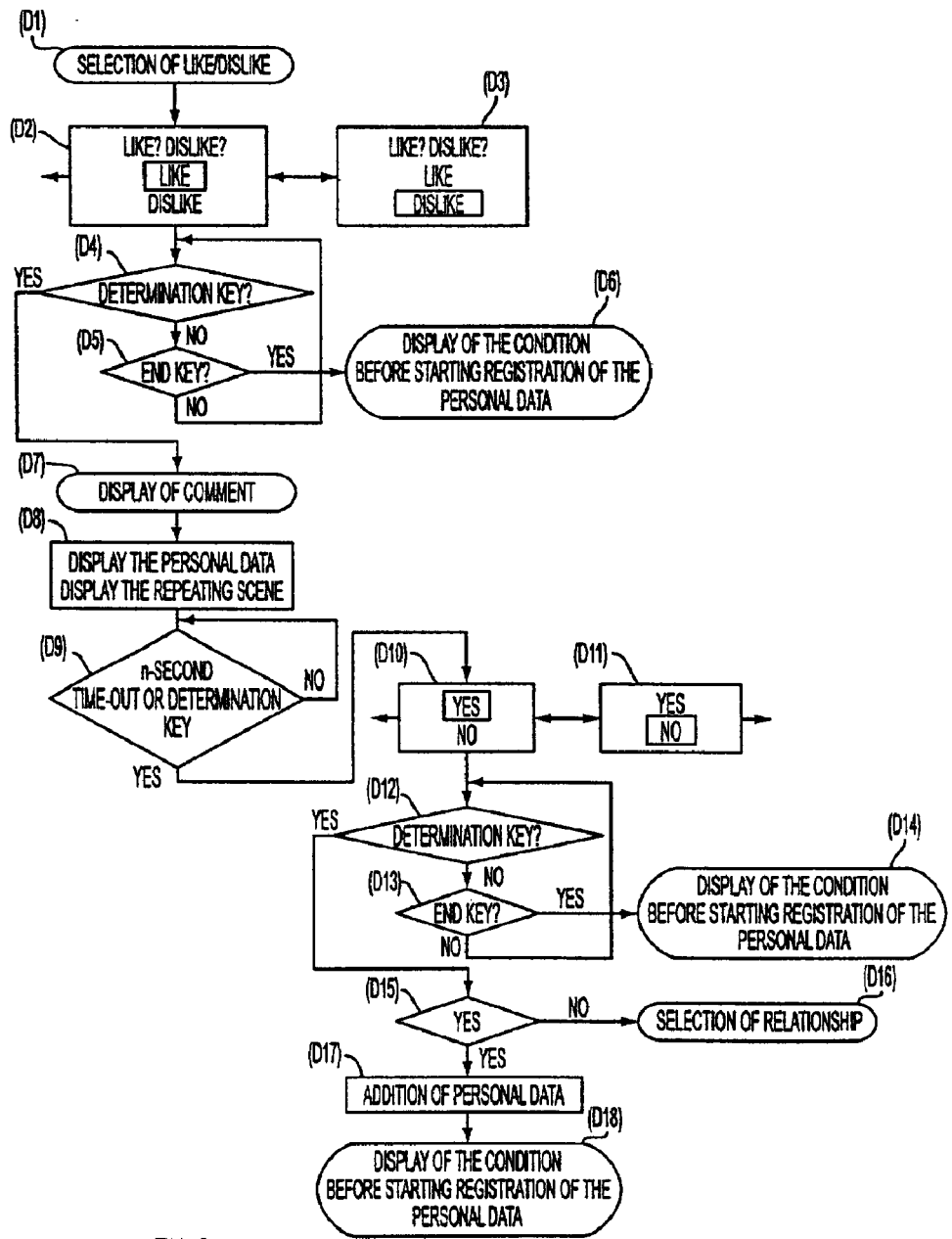
FIG. 8 illustrates a flowchart for registering personal data in a preferred embodiment of the present invention.

FIG. 8 illustrates the process following the process illustrated in FIG. 7. The control unit 4 executes the process in the step (D1) for selecting like or dislike identical to the step (C18) explained above. Namely, the control unit 4 controls the display unit 7 to display the image for urging a user to select any one of like/dislike as indicated in (D2), (D3). Here, the control unit 4 determines whether the selection determination key of the input operation unit 5 is depressed or not (D4). Moreover, when depression of the selection determination key is detected, the control unit 4 causes the display unit 7 to display the comment (D7). Meanwhile, if depression of the selection determination key is not detected, the control unit 4 determines whether the end key of the input operation unit 5 is depressed or not (D5). Here, the control unit 4 executes, upon detection of depression of the end key, the process to return to the condition before starting registration of the personal data (D6) and returns, when depression of the end key cannot be detected, to the process of (D4).

In the case of displaying the comment (D7), the control unit 4 causes the display 7 to display the input personal data together with the selected character image so that a user can confirm the input data (D8).

Here, the control unit 4 determines whether the determination key of the input operation unit 5 is depressed or not or the n-second time-out is generated or not (D9). Upon detection of depression of the determination key or n-second time-out, the control unit controls the display 7 to display an image for urging a user to select any one of YES or NO as indicated in (D10), (D11). Moreover, the control unit 4 determines whether the selection determination key of the input operation unit 5 is depressed or not (D12).

Here, when depression of the selection determination key is detected, the control unit 4 determines whether YES or NO is selected (D15). Upon detection of selection of "NO", the control unit 4 shifts to the process of the step to select relationship between the user and communication partner (D16). Namely, the control unit 4 shifts to the process of the step (C1) of FIG. 7. On the other hand, when depression of the selection determination key is not detected, the control unit 4 determines whether the end key of the input operation unit 5 is depressed or not (D13). Here, upon detection of the end key, the control unit 4 executes the process to return to the condition before starting registration of the personal data (D14) and then returns to the process of (D12) when depression of the end key is not detected.

When it is determined that "YES" is selected in the step (D15), the control unit 4 executes the process to additionally register the personal data to the registering field 6a (refer to FIG. 1) (D17) and then return to the condition before starting registration of the personal data (D18).

Registration of personal data can easily be made by a user by presenting the registration guidance (by displaying input sequence guidance as the message together with the character of selected kind) to the user when it is proved, for example, on the occasion of memory dial registration, as a result of determination by the control unit that any personal data is not registered at the time of transmission and reception of the first mail.

FIG. 9 illustrates a table indicating examples of items to be registered as the personal data and a table indicating examples of items of record (history) conditions and frequency of transmission/reception (outgoing/incoming) conditions. The record conditions include, as illustrated in FIG. 9, "Today", "Yesterday", "The day before yesterday", "The day before three or more days" and "None". The control unit 4 determines whether any item should be selected among these indicated above based on the clock function of the hand-held telephone set. Namely, the control unit 4 determines, using the time (date and time) indicated by the calendar function, whether the previous transmission or reception should correspond to any item of "Today", "Yesterday", "The day before yesterday", "The day before three or more days" and "None", on the basis of the information stored in the record field of memory 6b. The frequency condition includes "Twice today", "Everyday", "Frequent", "Only today", etc. The control unit 4 obtains the communication record (history) with the communication partner from the memory 6b for each communication partner and determines whether this transmission or reception corresponds to any item using the time (date and time) indicated with the calendar function.

Therefore, the control unit 4 displays a varied scene of character images and contents of the comment at the time of transmission and reception depending on the combination of the record condition (or frequency condition) and registered personal data (moreover, kind of character). Corresponding to such a combination, character images and contents of the comment for a scene, are stored as data in the memory 6. For instance, if today is the $10^{th}$, the number of times of transmission (or reception) in "$10^{th}$", "$9^{th}$", "$8^{th}$", "Before $7^{th}$" is calculated with the calendar function based on the communication record information stored in the record field 6b (refer to FIG. 1) (it is also possible to store, in the memory 6, the calculation result corresponding to the communication partner). Therefore, when transmission or reception is conducted at least once in the respective day among four days, this transmission or reception corresponds to "Everyday" of the frequency condition. Moreover, when there is no record of transmission or reception during four days in the past and transmission or reception is performed first, today, such transmission or reception corresponds to "Only today" of the frequency condition. As the frequency condition, the control unit 4 can perform the calculation, for example, only for the mail transmission and reception as the object.

Here, the personal data is formed through combination of the items "Friend", "Acquaintance", "Sweetheart", "Family" or "Business" as indicated in steps (D2) to (C5), items "Male", "Female" indicated in the steps (C13), (C14) and items "Like", "Dislike" indicated in the steps (D2), (D3). Here, it is also possible to replace the related information of the other kinds with these combinations and include such information to these combinations. For instance, the personal data in such a case that a user is a female user, the individual data is registered in the registration field 6a and each item is selected under the condition that the relationship between user and the communication partner is defined as "Female", "Friend" and "Like" is formed through combination of "3. Like-Friend-Same sex". The personal data in such a case that a user is a male user, the individual data is registered in the registration field 6a and each item is selected under the condition that the relationship between user and communication partner is defined as "Sweetheart" is formed through combination of "3. Like-Sweetheart-Opposite sex". In this case (sweetheart is selected), if condition of dislike is selected as the item, a contradiction may be generated. Therefore, when a user has selected the item "Sweetheart", the other items "Like", "Female" could also be automatically selected and set with the control unit 4.

The control unit 4 (refer to FIG. 1) controls the display 7 to display, for example, at the time of transmission or reception, the scene of the character and the comment of the kind selected by the user based on the communication record (history) information (stored information of record field 6b) and personal data (registered information of registration field 6a). For instance, when "Friend", "Same sex", "Like" are registered as the personal data and the frequency condition of the communication record corresponds to "Today, only", the control unit 4 controls the display 7 to display the comment such as "I also hope OOOO (name of the communication partner) is a friend of mine." together with or before or after the character image of the selected kind. Moreover, when the frequency condition of the communication (the transmission of E-mail) record is "Twice, today", the control unit 4 controls the display 7 to display the comment such as "What has been written, this time? Please tell me!" together with the character of the selected kind. As explained above, the comment displayed on the display 7 under the control of the control unit 4 should preferably assume at least first transmission or reception of mail or the number of times of transmission and reception of mail depending on the content of comment. Display of the comment may be realized by storing different comments in the memory 6 corresponding to each item of the frequency condition of the communication record.

Moreover, when a user registers "Dislike" as the personal data and the frequency condition corresponds to "Frequent", the control unit 4 causes the display 7 to display the comment such as "Do you want to set refusal of incoming?" together with the character image of the selected kind. Moreover, the control unit 4 causes the display 7 to display the comment to urge the user to select "YES" or "NO". Here, when a user selects "YES" with manipulation of the input operation unit 5, the control unit 4 establishes the setting to reject the reception of mail from this communication partner. Therefore, the setting to reject an annoying mail can be established easily through combination of the personal data and frequency information. Moreover, even at the time of reception of a communication call in addition to a mail, the control unit 4 is capable of establishing the setting to reject incoming annoying calls through display of the comment depending on the personal data explained above.

Figure 10:
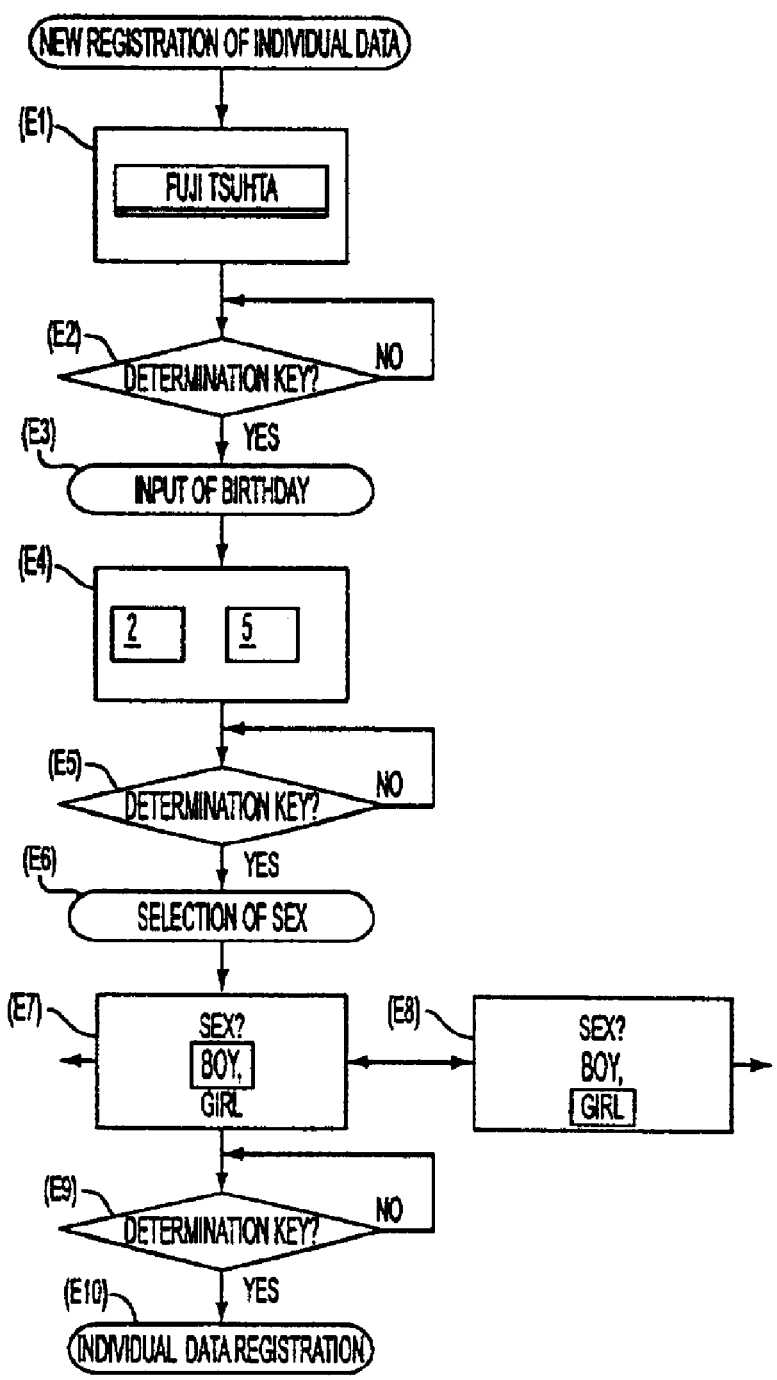
FIG. 10 illustrates a flowchart for registering personal data.

FIG. 10 illustrates a flowchart for individual data input. The control unit 4 controls the display 7 to display, at the time of newly registering individual data as the user information, the comment such as "What is your name?". When the user name "Fuji Tsuhta", for example, is input from the input operation unit 5 (refer to FIG. 1) (E1), the control unit 4 moreover determines whether the determination key of the input operation unit 5 is depressed by a user or not (E2). Here, the control unit 4 starts, upon detection of depression of the determination key, the input process of the birthday (E3). That is, the control unit 4 causes the display 7 to display the comment such as "Your birthday, please?". A user inputs the birthday at the display position of Month and Day with manipulation of the input operation unit 5 (E4). FIG. 10 indicates the case where the birthday "Feb. 5" is input.

Moreover, the control unit 4 determines whether the determination key of the input operation unit 5 is depressed by a user or not (E5). When depression of the determination key is detected, the control unit 4 shifts to the process to select the sex (E6). Namely, as indicated in (E7), (E8), the control unit 4 controls the display 7 to display the comment such as "What is your sex?" to urge the user to select any one of "Boy" or "Girl". Here, when depression of the determination key of the input operation unit 4 is detected, the control unit 4 registers any one selected from "Boy" and "Girl" to the registration field 6a (refer to FIG. 1) as the individual data (E10). When the control unit 4 detects depression of the end key in the steps (E2), (E5), (E9), the condition before starting registration of the personal data is displayed.

The individual data registered to the registration field 6a of the memory 6 is the data in relation to the user individual such as name, sex, birthday, etc. Moreover, the personal data indicates the relationship between the user and communication partner such as friend, acquaintance, sweetheart, family, business, like, dislike, etc. It is recommended that such data is added or updated later. Moreover, the other kind of data such as age, name and address, etc. may be included as the item of the individual data or personal data.

Figure 11:
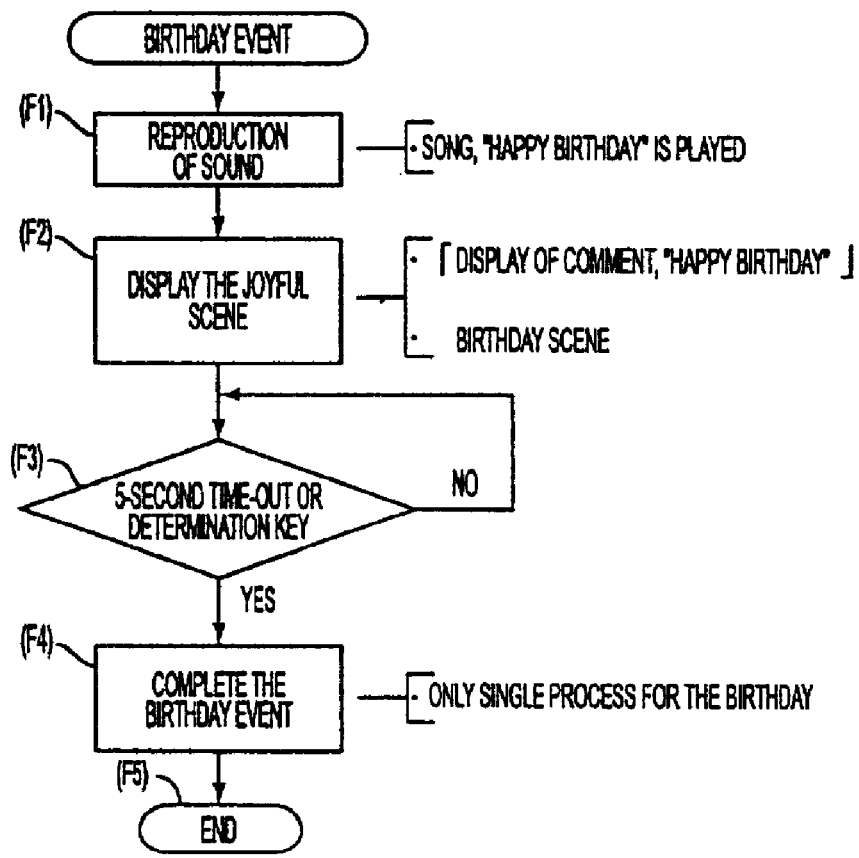
FIG. 11 illustrates a flowchart in regard to a birthday event.

FIG. 11 illustrates a flowchart of the birthday event. The control unit 4 can detect with the calendar function that today is the birthday of one of the individual data registered in the step (E4) of FIG. 10. Therefore, the control unit 4 sets the flag on this birthday and receives a mail on this birthday, the control unit 4 plays the music, for example, of the "Happy birthday" with the sound producing function (the data for outputting the music of "Happy birthday" from a speaker 9 is stored in the memory 6 and the control unit 4 reads such data and drives the speaker 9)(F1). Moreover, the control unit 4 controls the display 7 to display the scene that the character is pleased and the comment such as "Happy birthday" (F2). Moreover, the control unit 4 determines whether the determination key of the input operation unit 5 is depressed or the n-second time-out has been generated or not (F3). Upon detection of depression of the determination key or time-out, the control unit 4 resets the flag under the condition that the birthday event process has been completed (F4) and completes the birthday event (F5). On the birthday, it is also possible to establish the setting to conduct again the operation explained above for each event without resetting the flag. Moreover, the flag management may be realized for each communication partner.

The present invention can also be applied not only to the hand-held terminal such as a hand-held telephone set but also to the other communication terminal having the communication function unit. It is also possible to simultaneously display various comments together with the character image corresponding to the display area of the display 7 (refer to FIG. 1)(of course, such comment may be displayed individually and sequentially). In addition, it is also possible that the mail reading function and various functions such as games, for example, may be loaded by storing various programs to the memory 6. Or, it is also possible to realize the expanding function of the memory 6 by providing an inserting/removing slot for a memory card to the hand-held telephone set. In the case of such structure, it is possible to store the information comment display program explained above using the memory card as the storage medium to load such medium to the communication terminal such as the hand-held telephone set.

Even when the hand-held telephone set is busy, the control unit 4 is capable of controlling the display 7 to display the character image and comment on the basis of the personal data and communication record information. In this case, it is generally impossible to watch the display 7 of the hand-held telephone set, but when hand-free function is used or speaker and microphone using the extension cord are used for communication, there is no problem because it is possible to watch the display.

Moreover, in FIG. 1, it is also possible that the record field 6b of the memory 6 can be defined as the second memory for storing the communication record in correspondence to the identifying information of the transmitting party during the incoming of voice call or incoming of E-mail (message information). For example, when the telephone number X of the hand-held telephone set is used as the identifying information and an E-mail is received from the hand-held telephone set, the control unit 4 records the communication record to the record field 6b, considering reception of a single mail corresponding to the identifying information X. In this case, the date or time or both date and time information of the incoming may be stored as the communication record. Moreover, the total number of transmission and reception (outgoing and incoming) of mails may be stored as one category of the mail communication. In addition, outgoing voice calls and mail transmission (outgoing) may also be stored as one category of transmission. Namely, various categories of static process for management of communication record can be selected.

Here, the communication record information is stored corresponding to the identifying information such as telephone number, etc., but when the other identifying information such as name or the like is stored in the memory dial corresponding to the telephone number, it is also possible that the telephone number is converted to the corresponding other identifying information such as name or the like and the other identifying information such as name is stored in the memory 6 corresponding to the communication record information. Of course, when the identifying information of the hand-held telephone set of the transmitting party transmitted via the radio base station is the device ID or mail address, the device ID or mail address may be used as the identifying information corresponding to the communication record information.

Here, upon detection of reception (incoming) of mail (or the incoming of a voice call), the control unit 4 extracts the telephone number X of the transmitting party from the received signal. The control unit 4 also extracts the record information corresponding to the extracted telephone number X stored in the record field 6b and calculates the total number of times of reception including this reception. The control unit 4 controls the display 7 to display the calculation result, telephone number X or the name corresponding to the telephone number X registered in the memory dial as the character information.

Here, the control unit 4 previously stores the image information (still image or moving image) corresponding to the number of times of reception in the memory 6 and then causes the display 7 to display the image information by reading the information from the memory 6 corresponding to the number of times of reception (incoming) obtained from the calculation result.

When the date and time information is also stored in the record field 6b with the number of times of reception, the control unit 4 is also capable of controlling the display 7 to display the comment (message) such as "This is the X-th reception, today." By summing the number of times of reception (incoming) in units of a day. When the control unit 4 causes the record field 6b to store the number of times of reception in units of a day, the communication record information indicating the number of times of reception (incoming) is cleared in the next day and thereby a new record information may be stored.

The control unit 4 is also capable of obtaining, with the calculation, the receiving (incoming) frequency from the receiving record information stored in the record filed 6b in place of only the number of times of incoming (for example, average value such as number of times/hour, number of times/day, number of times/week, number of times/(several hours, several days, several weeks) or passing hours or passing days from the preceding incoming, preceding incoming day, perceiving incoming time or the like) and controlling the display 7 to display the calculation result as the comment (message). For example, when it is determined by calculation that the mail is received for three times/day or more in average through one week, the control unit 4 controls the display 7 to display the comment such as "Receiving (Incoming) frequency is three times/day". Moreover, it is also possible for the control unit 4 to control the display 7 to display an abstract message. For instance, when the reception (incoming) frequency is 0.1 times/day in average through one week, the control unit 4 controls display 7 to display a message such as "He (She) is a person who sends me a mail occasionally." and when the reception (incoming) frequency is three times/day, the control unit 4 causes the display 7 to display a message such as "He(She)is a person who often sends me a mail".

Moreover, when it is determined from the incoming record information stored in the record field 6b that the preceding reception (incoming) was generated before seven weeks, the control unit 4 causes the display 7 to display the messages such as "Preceding incoming was generated before seven weeks" or "Seven weeks have passed from the preceding incoming" or the abstract message such as "This mail has been received after a long period of time". When the preceding incoming occurs a day before, the control unit 4 is capable of controlling the display 7 to display the message such as "The preceding incoming occurs a day before" or the abstract message such as "He(She) has transmitted a mail again". Various messages explained above are stored in the memory 6 and thereby the control unit 4 can read the message corresponding to the calculation result about the communication record information and control the display 7 to display this message.

In the case where a business report is received as an E-mail with a hand-held telephone set, it is also possible that a user previously stores incoming plan information to a fourth memory such as the registration field 6a or the like and the control unit 4 determines whether an E-mail is received in accordance with the incoming plan using the calendar function or not. For example, the incoming plan of E-mail from the communication terminal is registered to the memory 6 corresponding to the telephone number of the communication terminal such as the hand-held telephone set of the transmitting party or the name of such user. As an example of the incoming plan, n-traffic/hour (n=integer), n-traffic/day, n-traffic/week, n-traffic/month or date such as June, 20 or the like (here, a plurality of days may also be designated, for example, Mar. 3, Apr. 3, May, 3, etc.) may be listed. When a user also desires to determine the incoming plan for voice calls, it is also possible to set the incoming plan as n-traffic/day, n-traffic/week, etc. Such setting of an receiving (incoming) plan may be changed as desired corresponding to the business contents.

The control unit 4 obtains, periodically or in the timing of the operation of the input operation unit 5, the communication record information stored in the record field 6b and determines whether such information satisfies the preset incoming plan or not. When it is determined that the incoming plan is not satisfied, the control unit 4 controls the display 7, when the user name is assumed as A and the telephone number as X, to display the comment such as "Mr. A of the telephone number X does not satisfies the incoming plan". On the occasion of display, the control unit 4 causes the display 7 to display the still image or moving image of characters of the kinds selected by the user (simultaneously with the comment or before and after the display of comment). When it is determined that the incoming plan is satisfied, the control unit 4 controls the display 7 to display the comment such as "Mr. A of the telephone number X satisfies the incoming plan". In this case, it is also possible to display the still image or moving image of characters of the kinds selected by the user.

When it is determined for the incoming from Mr. A of the telephone number X that the incoming plan is not satisfied as a result of determination of whether the incoming plan is satisfied or not, the control unit 4 controls to automatically transmit an E-mail of the predetermined content (generated by a user previously and previously registered in the memory 6 or registered in the memory 6 at the time of selling) to Mr. A of the telephone number X. This predetermined content is, for example, the content of a warning such as "Warning: Incoming plan is not satisfied". Moreover, in the case of the incoming plan of 1-traffic/day, it is also possible that when only m-hour is left until the mail transmission limit to achieve the incoming plan (for example, 22 o'clock, two hours before the transmission limit), a message such as "Warning: The mail transmission limit is coming up." is transmitted automatically to the party who should satisfy the incoming plan. Moreover, it is also possible for the control unit 7 to introduce the control system, before transmission of the message of such warning content, to control the display 7 to display the message such as "Do you want to transmit the warning message?" to determine whether the message should be transmitted or not depending on the key operation of the input operation unit 5.

Moreover, it is also possible to realize the agent function with the control unit 4, program stored in the memory 6 and the display function of display 7 and therefore this agent function urges the user to display various comments and conduct the registration process. It is further possible that the program, character and comments for display corresponding to the combination of the communication record information and personal data are recorded to the storage medium which can be read with a computer and such contents may be down-loaded to the communication terminal from such storage medium.

As explained above, a user can easily detect the communication conditions of each communication by using the communication terminal of the present invention.

In addition, the communication terminal of the present invention displays comments and character images depending on the communication conditions based on the related information between the transmitting party and receiving party to assure easier and simplified manipulation even for a beginner.

Moreover, the communication terminal of the present invention executes a guidance display for various manipulations and display of communication conditions. Accordingly, the communication terminal of the present invention assures, for a user, easy detection of the communication condition, excellent manipulation ability and familiarity even if a user is a beginner.

The communication terminal of the present invention can easily be used not only for private use but also for business use under the control for management of communications.

What is claimed is:

1. A communication terminal having a display comprising:
   a receiving unit to receive a signal including at least identifying information of a transmitter of said signal;
   a memory to store a communication record with respect to the transmitter; and
   a controller to control said display to display an image indicating a frequency of communication with the transmitter when said communication terminal receives said signal.

2. The communication terminal of claim 1,
   wherein the communication record includes a history of communication with the transmitter and the frequency of communication includes the number of times the transmitter communicates with the communication terminal within a set period of time.

3. A communication terminal having a display comprising:
   a memory to store a communication record with respect to a transmitter; and
   a controller to control said display to display at least one of a message and an image, said message or said image corresponding to a frequency of communication with the transmitter, and said display displays said at least one of a message and an image when said communication terminal receives a signal including at least identifying information of the transmitter.

4. The communication terminal of claim 3,
   wherein the communication record includes a history of communication with the transmitter and the frequency of communication includes the number of times the transmitter communicates with the communication terminal within a set period of time.

5. A display method of a communication terminal having a display comprising the steps of:
   storing a communication record with respect to a transmitter having identifying information;
   receiving a signal including at least the identifying information of the transmitter; and
   controlling said display to display at least one of a message and an image, said message or said image corresponding to a frequency of communication with the transmitter determined by using said communication record, and said display displays said at least one of a message and an image when said communication terminal receives said signal.

6. The display method of claim 5, further comprising the step of: after the receiving step,
   updating the communication record corresponding to the received signal, but if no communication record exists then staring the communication record corresponding to the received signal.

7. A communication terminal having a transmitting/receiving function and a display, said communication terminal comprising:
   a first memory to store personal data of a user of another communication terminal with whom said communication terminal may communicate, said personal data stored corresponding to any one of identifying information which identifies another communication terminal and identifying information which identifies a user of another communication terminal;
   a second memory to store a record of incoming communication, said record being stored corresponding to any one of identifying information of a transmitting communication terminal and identifying information of a user of the transmitting communication terminal; and
   a controller to control said display to selectively display, in any one timing of incoming from a transmitter and after display of receiving content from a transmitter, in a case of a receiving signal including at least one of the identifying information of the transmitting communication terminal and the identifying information of the user of the transmitting communication terminal at least one of a message and an image selected based on said personal data in said first memory and said record of incoming communication in said second memory.

8. The communication terminal of claim 7, wherein said controller displays said at least one of the message and the image for one time period for a received signal after a display indicating the received signal has been received.

9. A display method in a communication terminal having a transmitting/receiving function and a display, said display method comprising the steps of:

storing personal data of a user of another communication terminal with whom said communication terminal may communicate, said personal data stored corresponding to any one of identifying information which identifies another communication terminal and identifying information which identifies a user of another communication terminal;

storing a record of incoming communication, said record being stored corresponding to any one of identifying information of a transmitting communication terminal and identifying information of a user of the transmitting communication terminal; and controlling said display to selectively display, in any one timing of incoming from a transmitter and after display of receiving content from a transmitter, in a case of receiving signal including at least one of the identifying information of the transmitting communication terminal and the identifying information of the user of the transmitting communication terminal, at least one of a message and an image selected based on a combination of said personal data of said transmitting communication terminal and said incoming record of said transmitting communication terminal.

10. The display method of claim 9, wherein the controlling step displays at least one of the message and the image for one time period for a received signal after a display indicating the received signal has been received.

11. A communication terminal having a transmitting/receiving function and a display, said communication terminal comprising:

a first memory to store personal data of a user of another communication terminal with whom said communication terminal may communicate, said personal data stored corresponding to any one of identifying information which identifies another communication terminal and identifying information which identifies a user of another communication terminal;

a third memory to store a record of outgoing communication, said record of outgoing communication being stored corresponding to any one of the identifying information of another communication terminal receiving an outgoing communication and the identifying information of the user of another communication terminal receiving the outgoing communication; and a controller to control said display to selectively display, in one of timing of message edition to a receiver and outgoing to a receiver, at least one of a message and an image selected based on a combination of said personal data an said first memory and said record of outgoing communication in said third memory.

12. A communication terminal having a transmitting/receiving function and a display, said communication terminal comprising:

a first memory to store personal data of a user of another communication terminal with whom said communication terminal may communicate, said personal data stored corresponding to any one of identifying information which identifies another communication terminal and identifying information which identifies a user of another communication terminal;

a third memory to store a record of outgoing communication, said record of outgoing communication being stored corresponding to any one of the identifying information of another communication terminal receiving an outgoing communication and the identifying information of the user of another communication terminal receiving the outgoing communication; and a controller to control said display to selectively display, in any one timing of message edition to a receiver, outgoing to a receiver and after outgoing to a receiver, at least one of a message and an image selected based on a combination of said personal data in said first memory and said record of outgoing communication in said third memory, wherein said controller displays said at least one of the message and the image for one time period for a sent message after a display indicating the message has been sent.

13. A display method in a communication terminal having a transmitting/receiving function and a display, said display method comprising the steps of:

storing personal data of a user of another communication terminal with whom said communication terminal may communicate, said personal data stored corresponding to any one of identifying information which identifies another communication terminal and identifying information which identifies a user of another communication terminal;

storing outgoing record corresponding to any one of identifying information of another communication terminal of receiving party and identifying information of the user of another communication terminal; and controlling said display to selectively display, in one of timing of message edition to a receiver and timing of outgoing to a receiver, at least one of message and image selected based on combination of said personal data of said receiver and said outgoing record of said receiver.

14. A communication terminal having a transmitting/receiving function, a calendar function for management of day and time information and a display, said communication terminal comprising:

a fourth memory to store an incoming plan before an incoming call corresponding to any one of identifying information of another communication terminal and identifying information of a user of another communication terminal;

a second memory to store an incoming record with anyone of day, time and both data corresponding to any one of identifying information of a transmitting communication terminal and identifying information of a user of said transmitting communication terminal; and a controller to control said display to display at least one of a message and image, said message or said image corresponding to a determination result, wherein said determination result is whether the incoming plan corresponding to any one of said transmitting communication terminal and the user of said transmitting communication terminal is satisfied or not.

15. A display method of a communication terminal having a transmitting function, a receiving function, a calendar function for management of day and time and a display, said display method comprising the steps of:

storing an incoming plan before an incoming call in corresponding to any one of identifying information of another communication terminal and identifying information of a user of another communication terminal and also storing an incoming record with anyone of day, time or both of these information corresponding to any one of identifying information of a transmitting communication terminal and identifying information of a user of said transmitting communication terminal;

determining using said incoming record whether said incoming plan corresponding to any one of said transmitting communication terminal and the user of said transmitting communication terminal is satisfied or not; and controlling said display to display at least one of a message and image depending on The determination result.

16. A communication terminal having at least an E-mail transmitting/receiving function, a calendar function for management of day and time information and a display, said communication terminal comprising:

a fourth memory to store an incoming plan before an incoming call corresponding to any one of identifying information of communication terminal and identifying information of a user of said communication terminal;

a second memory to store an incoming record with any one of day, time and both information corresponding to any one of identifying information of a transmitting communication terminal and identifying information of a user of said transmitting communication terminal; and an E-mail transmitting unit to transmit an E-mail of predetermined content to said transmitting communication terminal when it is determined that said incoming plan corresponding to any one of said transmitting communication terminal and the user of said transmitting communication terminal is not satisfied.

17. An E-mail transmitting method of a communication terminal having at least an E-mail transmitting/receiving function, a calendar function for management of day and time information and a display, said E-mail transmitting method comprising the steps of:

storing an incoming plan before an incoming call corresponding to any one of identifying information of another communication terminal and identifying information of a user of another communication terminal and also storing an incoming record with anyone of day, time and both information corresponding to any one of identifying information of a transmitting communication terminal and identifying information of a user of said transmitting communication terminal;

determining using said incoming record whether said incoming plan corresponding to any one of said transmitting communication terminal and the user of said transmitting communication terminal is satisfied or not; and transmitting when said receiving plan is not satisfied an E-mail of predetermined content to said transmitting communication terminal.

18. A communication terminal having a display comprising;

a first memory to store personal data of other parties, said parties being able to communicate with said communication terminal through a communication network, a second memory to store a communication record of each party of the other parties respectively.

a third memory to store a plurality of messages and images, a controller to select at least one of a message and an image, said message and said image selectively based on a combination of said personal data and said communication record corresponding to said other party when said communication terminal receives information from said other party, and control said display to display the selected message and image when the communication terminal receives an incoming call.

19. A communication terminal having a transmitting/receiving function and a display, said communication terminal comprising:

a first memory area to store personal data of a user of another communication terminal with wham said communication terminal may communicate, said personal data stored corresponding to any one of identifying information which identifies another communication terminal and identifying information which identifies a user of another communication terminal;

a second memory area to store a record of communication, said record being stored corresponding to any one of identifying information of another communication terminal and identifying information of a user of another communication terminal; and a controller to control said display to selectively display, at a time in relation to at least one of an incoming communication from another communication terminal and after display of received content from another communication terminal, at least one of a message and an image selected based on at least one of said personal data in said first memory area and said record of communication in said second memory area, wherein the incoming communication from another communication terminal includes at least one of the identifying information of the another communication terminal and the identifying information of the user of another communication terminal.

20. The communication terminal of claim 19, wherein said controller displays said at least one of the message and the image for one time period for a received signal after a display indicating the received signal has been received.

21. The communication terminal of claim 19, wherein said second memory &ea further storing a record of outgoing communication, said record of outgoing communication being stored corresponding to any one of the identifying information of another communication terminal receiving an outgoing communication and the identifying information of the user of another communication terminal receiving the outgoing communication; and said controller further controlling said display to selectively display, at a time in relation to at least one of editing a communication to be sent to a receive, sending said communication to said receiver and after sending said communication to said receiver, at least one of a message and an image selected based on at least on of said personal data in said first memory area and said record of communication in said second memory area.

22. The communication terminal of claim 21, wherein said at least one of a message and an image is selected based on a combination of said personal data in said first memory area and said record of communication in said second memory area and said record of communication includes said outgoing communication record.

* * * * *